United States Patent
Lazare

(10) Patent No.: US 7,328,870 B2
(45) Date of Patent: Feb. 12, 2008

(54) AIRCRAFT PROPULSION SYSTEM COMPRISING FOUR ENGINES WITH PUSHER PROPELLERS

(75) Inventor: Ion Lazare, Colomiers (FR)

(73) Assignee: Airbus France, Toulouse (FR)

( * ) Notice: Subject to any disclaimer, the term of this patent is extended or adjusted under 35 U.S.C. 154(b) by 287 days.

(21) Appl. No.: 11/140,970

(22) Filed: Jun. 1, 2005

(65) Prior Publication Data
US 2006/0186265 A1    Aug. 24, 2006

(30) Foreign Application Priority Data
Jun. 3, 2004    (FR)    ................... 04 05977

(51) Int. Cl.
*B64D 27/06*    (2006.01)
(52) U.S. Cl. ................. 244/55; 24/1 N; 24/62
(58) Field of Classification Search ................ 244/1 N, 244/13, 53 R, 54, 55, 62
See application file for complete search history.

(56) References Cited

U.S. PATENT DOCUMENTS

| | | | | | |
|---|---|---|---|---|---|
| 2,178,725 A | * | 11/1939 | Lawrence | ................... | 74/661 |
| 2,219,980 A | * | 10/1940 | De Seversky | ................... | 244/54 |
| 3,485,462 A | * | 12/1969 | Spence | ................... | 244/55 |
| 4,136,845 A | * | 1/1979 | Eickmann | ................... | 244/54 |
| 2002/0011539 A1 | | 1/2002 | Carter, Jr. | | |

FOREIGN PATENT DOCUMENTS

FR    2759971    8/1998

OTHER PUBLICATIONS

Preliminary Search Report dated Nov. 17, 2004 with English translation.
ANONYMOUS; "Photos ILA 2004—Aerospace Technology," Internet Article Press Service, 'en ligne! XP002306032, Extrait de l'Internet: <URL:http://www.ila-berlin.com/ila2004-11-171, pp. 1-2.

* cited by examiner

*Primary Examiner*—Rob Swiatek
(74) *Attorney, Agent, or Firm*—Stevens, Davis, Miller & Mosher, LLP

(57) ABSTRACT

An aircraft propulsion system includes four engines with pusher propellers. The engines are mounted in pairs on the wings of the aircraft and the respective directions of rotation thereof, when viewing the engines from the rear of the aircraft from left to right, are: (1) the clockwise direction, (2) the counterclockwise direction, (3) the clockwise direction, and (4) the counterclockwise direction.

1 Claim, 1 Drawing Sheet

AIRCRAFT PROPULSION SYSTEM COMPRISING FOUR ENGINES WITH PUSHER PROPELLERS

FIELD OF THE INVENTION

The present invention relates to a propulsion system for an aircraft, comprising four engines with pusher propellers.

BACKGROUND OF THE RELATED ART

Generally, said engines, which are mounted in pairs on the two wings of the aircraft, are identical and have the same direction of rotation, namely the clockwise direction when viewing said engines from the rear of the aircraft.

Such a propulsion system has a certain number of advantages, in particular easier and simpler maintenance and upkeep, because of the presence of four identical engines, and also therefore of identical auxiliary means (mounting means, control means, etc.).

However, such a propulsion system has disadvantages, particularly:

an asymmetrical air flow as seen from the fuselage and the tail fin of the aircraft owing to the asymmetry produced by the wake of the propellers; and a high noise nuisance level on the skin of the fuselage, which requires intensive and constraining noise-reduction treatments on the aircraft.

SUMMARY OF THE INVENTION

The present invention relates to a propulsion system for an aircraft, comprising four engines with pusher propellers, this system making it possible to overcome the aforementioned disadvantages.

To this end, according to the invention said propulsion system of the type comprising four engines with pusher propellers, these engines being mounted in pairs on the wings of the aircraft and each having a specific direction of rotation, is noteworthy in that the respective direction of rotation of said four engines when viewing said engines from the rear of the aircraft is, from left to right:

the clockwise direction;
the counterclockwise direction;
the clockwise direction; and
the counterclockwise direction.

Since, by virtue of the invention, the two engines of each wing are contra-rotating, they concentrate the air and generate an air flow between them which is directed rearward in the direction of the tail fin. Thus, the tail fin is exposed on both sides to a convergent air flow, which increases the efficiency thereof.

Furthermore, the propulsion system according to the invention has a nuisance level which is lower than that of the known propulsion system referred to above.

BRIEF DESCRIPTION OF THE DRAWING

The single FIGURE of the attached drawing will clearly show how the invention can be implemented. It schematically represents a rear view of an aircraft to which a propulsion system according to the invention has been applied.

DETAILED DESCRIPTION OF THE INVENTION

Figure 1:
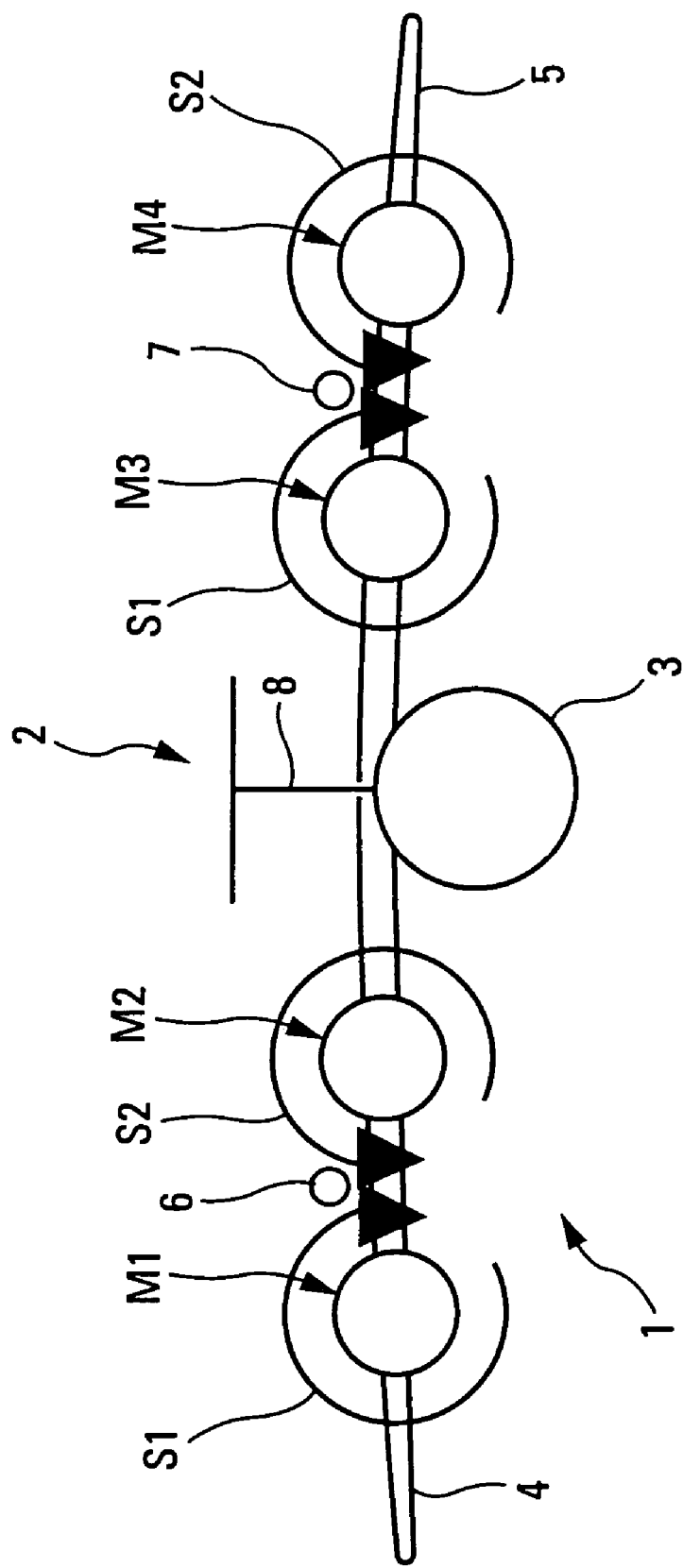

The propulsion system 1 according to the invention is intended for the propulsion of an aircraft 2, for example a military transport aircraft, comprising a fuselage 3 provided on either side with wings 4 and 5 and, to the rear, with a tail fin 8.

This propulsion system 1 comprises:

four customary engines M1, M2, M3 and M4 with pusher propellers (not shown), with the engines being mounted in pairs on the wings 4 and 5 of the aircraft 2 and each having a specific direction of rotation; and customary means (not shown) for retaining, supplying and controlling said engines M1, M2, M3 and M4 in the customary manner.

According to the invention, the respective direction of rotation of said four engines when viewing said engines from the rear of the aircraft 2 as shown in FIG. 1 is, from left (free end of the wing 4) to right (free end of the wing 5):

the clockwise direction S1 (with regard to the engine M1);
the counterclockwise direction S2 (with regard to the engine M2);
the clockwise direction S1 (with regard to the engine M3);
the counterclockwise direction S2 (with regard to the engine M4).

Consequently, on the wing 4, the two engines M1 and M2 are contra-rotating and the air is concentrated between these two engines M1, M2, as illustrated by a circle 6 in the FIGURE. This concentrated air flow is guided rearward in the direction of the tail fin 8.

Likewise, on the wing 5, the two engines M3 and M4 are contra-rotating and the air is concentrated between these two engines M3, M4, as illustrated by a circle 7 in the FIGURE. This concentrated air flow is likewise guided rearward in the direction of the tail fin.

Thus, the tail fin 8 is exposed on both sides to a convergent air flow, thereby increasing its efficiency.

The invention claimed is:

1. A propulsion system for an aircraft, comprising:

four engines with pusher propellers, the engines being mounted in pairs on the wings of the aircraft and each having a specific direction of rotation, wherein:

the respective direction of rotation of said four engines when viewing said engines from the rear of the aircraft is, from left to right:

the clockwise direction;
the counterclockwise direction;
the clockwise direction; and
the counterclockwise direction, the engines are mounted in a line along the wings from one side of the aircraft to the other, the two engines on the left side of the aircraft, viewed from the rear, are contra-rotating and air is concentrated between these two engines so as to guide the air flow in the direction of a tail fin of the aircraft, the two engines on the right side of the aircraft, viewed from the rear, are contra-rotating and air is concentrated between these two engines so as to guide the air flow in the direction of the tail fin of the aircraft, and the tail fin is exposed on both sides to a convergent air flow as a result of the pair of contra-rotating engines on each side of the aircraft.

* * * * *